(12) United States Patent
Zurmühle et al.

(10) Patent No.: US 6,866,077 B2
(45) Date of Patent: Mar. 15, 2005

(54) AUTOMATIC WELDING MACHINE

(75) Inventors: Walter Zurmühle, Kägiswil (CH); Bruno von Wyl, Kägiswil (CH)

(73) Assignee: Leister Process Technologies, Sarnen (CH)

(*) Notice: Subject to any disclaimer, the term of this patent is extended or adjusted under 35 U.S.C. 154(b) by 0 days.

(21) Appl. No.: 10/455,587

(22) Filed: Jun. 3, 2003

(65) Prior Publication Data

US 2004/0011472 A1 Jan. 22, 2004

(30) Foreign Application Priority Data

Jul. 17, 2002 (EP) .............................................. 02015925

(51) Int. Cl.⁷ .............................................. B32B 31/00
(52) U.S. Cl. ...................... 156/391; 156/497; 156/499; 156/574; 156/579
(58) Field of Search ................................ 156/497, 499, 156/574, 579, 391, 544

(56) References Cited

U.S. PATENT DOCUMENTS

| | | | |
|---|---|---|---|
| 3,080,910 A | | 3/1963 | Whitney, Jr. |
| 4,440,588 A | | 4/1984 | Stevenson et al. |
| 4,834,828 A | * | 5/1989 | Murphy ....................... 156/359 |
| 5,110,398 A | * | 5/1992 | Murphy ....................... 156/499 |
| 5,935,357 A | * | 8/1999 | Hubbard et al. ............... 156/82 |
| 6,170,550 B1 | * | 1/2001 | Niederberger ............... 156/544 |
| 6,325,126 B1 | * | 12/2001 | Rubenacker et al. ......... 156/497 |
| 6,453,964 B1 | * | 9/2002 | Pfotenhauer et al. ........ 156/391 |
| 6,537,402 B2 | * | 3/2003 | Pate et al. ..................... 156/71 |
| 6,761,201 B2 | * | 7/2004 | Pelcarsky et al. ........... 156/579 |
| 2003/0019586 A1 | * | 1/2003 | Henegar ...................... 156/497 |
| 2004/0194872 A1 | * | 10/2004 | Zurmuehle et al. ......... 156/157 |

FOREIGN PATENT DOCUMENTS

| | | |
|---|---|---|
| CH | 465 197 | 12/1968 |
| DE | 100 32 450 A1 | 1/2002 |
| EP | 0 300 209 | 1/1998 |

* cited by examiner

*Primary Examiner*—Mark A. Osele
(74) *Attorney, Agent, or Firm*—Bachman & LaPointe, P.C.

(57) ABSTRACT

An automatic welding machine for planar plastic materials, such as sealing sheets, tarpaulins or films, the chassis, in the welding position, in addition to being carried by the driving unit and the pressure device, also being carried by a rigid guide wheel, preferably in the front region of the chassis. With respect to a pressure roller running essentially on the welded overlap region, the guide wheel is arranged in such a way that, during the welding, it runs along the bottom plastic material parallel to the edge of the top plastic material. In addition, the guide wheel has a narrow running surface. During the welding, the guide wheel runs along the edge of the overlapping plastic material and the pressure roller runs essentially on the weld region. Due to this configuration, the automatic welding machine can follow the edge in such a way as to keep to the track, so that guidance by the operator or frequent corrections of the welding direction are not necessary. This leads to an increased weld quality and also to a higher welding speed. There is less interference from the background or due to the welding device swinging in laterally.

8 Claims, 10 Drawing Sheets

AUTOMATIC WELDING MACHINE

BACKGROUND OF THE INVENTION

The present invention relates to an automatic welding machine for planar plastic materials, having a chassis and, arranged thereon, a welding device, a driving unit, a pressure device for the materials welded in an overlapping manner.

Such automatic welding machines are generally known and are in use, and are used for welding tarpaulins of coated fabrics, films and sealing sheets of PVC-P, PE, ECB, CSPE, EPDM, PVDF, etc., and also PE-coated band fabrics for trucks, tents, covers in agriculture, biotopes, swimming pools, awnings, boat tarpaulins, inflatable boats, advertising tarpaulins, etc. Further similar materials occur in civil engineering, roof construction and flooring. These materials are referred to below as (planar) plastic materials. The plastic materials are arranged in an overlapping manner for welding, so that the two plastic materials lie one on top of the other in an overlap region and are referred to as a top plastic material and as a bottom plastic material. It is also possible for the plastic materials which are to be welded to one another to be placed in an abutting relationship and for a strip which covers both bottom layers in an overlap region to be welded to the respectively bottom plastic material. The known automatic welding machines can be used here too.

Hot-air welding sets, hot-wedge welding sets or a combination thereof may be used as the welding devices.

An automatic welding machine as is used in particular for welding plastic sealing sheets on roofs is shown in EP-A-1-946 057. These known automatic welding machines obtainable on the market have a chassis, on which a welding device is arranged such that it can be swiveled from a rest position into a working position. Furthermore, these automatic welding machines have transport rollers, with which the automatic welding machine is moved into the respective working position and aligned with the weld. According to the prior art, these transport rollers are adjustable in the vertical direction at least in the rear region by means of a mechanism in order to be able to take the weight of the automatic welding machine off the transport rollers in the welding position and transfer it to the driving unit and the pressure device. In the known device, the driving unit and the pressure device are combined in a driving and pressure roller. In the known sets, a guide wheel is located as guide device in the front region, this guide wheel performing a pointer function during the welding operation in order to show the track which is just being welded to the operator. The guide wheel does not take up any weight.

Furthermore, automatic welding machines for welding plastic films are known in which the welding device is arranged directly on the housing and which therefore has a (steerable) transport roller with respect to the rear driving and pressure rollers.

With automatic welding machines used for plastic tarpaulins or films, i.e. relatively thin and fine materials, there is the problem that, despite accurate adjustment of the automatic welding machine along the weld, the automatic welding machine has to be corrected again and again with regard to the track. The result of this is that the welded joint, simply in its appearance, constitutes more of a slalom line, and furthermore folds develop due to the partly oblique movement by means of the driving/pressure roller along the edge of the overlapping material.

The object of the present invention is therefore to propose an automatic welding machine which largely keeps to the track and thus ensures increased weld quality.

SUMMARY OF THE INVENTION

The foregoing object is achieved according to the invention for an automatic welding machine having a chassis and, arranged thereon, a welding device, a driving unit, a pressure device for the materials to be welded in an overlapping manner, wherein the chassis, in the welding position, in addition to being carried by the driving unit and the pressure device, is carried at least by one rigid guide wheel, the guide wheel, with respect to a pressure roller running essentially on the welded overlap region, being arranged in such a way that, during the welding, it runs along the bottom plastic material parallel to the edge of the top plastic material.

In the automatic welding machine according to the invention, the chassis, in the welding position, in addition to being carried by the driving unit and the pressure device, is carried by a guide wheel. In a known manner, the main weight thus lies on the driving unit and the pressure device, although, unlike the known devices, a rigid guide wheel, in order to support the chassis, also bears the weight in the front or the rear region. The weight therefore lies mainly on the pressure device and the driving device (e.g. a driven pressure roller) and the guide wheel. For the support and for avoiding tilting-over, depending on the configuration of the chassis, a further roller, for example a steering roller, which may at the same time serve as a transport roller, may be located to the side of the guide wheel and the driving unit and the pressure device. This further roller essentially has a supporting function. With respect to a pressure roller running essentially on the welded overlap region, the guide wheel is arranged in such a way that, during the welding, it runs along the bottom plastic material parallel to the edge of the top plastic material and presses into said bottom plastic material.

The axes of the guide wheel and of a pressure roller and driving roller, as pressure and driving device, are arranged parallel to one another. Before the start of welding, the automatic welding machine can be oriented once with the axes perpendicularly to the edge of the top plastic material. It maintains the orientation automatically during the welding operation and the forward movement and drifting-away is prevented. The guide wheel, which in the prior art has only performed a pointer function, has now assumed a guidance function during the forward movement of the automatic welding machine.

It is clear that the arrangement of the guide wheel in front of the chassis (at the front or rear) is able to perform the guidance function all the more effectively, the further away it is from the supporting rollers of the driving unit and pressure device. In principle, other supporting rollers are possible, although the arrangement of the supporting rollers (pressure rollers and guide wheel) in the specified relationship to one another as rigid rollers is to be regarded as the arrangement essential for the functional principle. Further modifications by additional rollers are more complicated and do not contribute to the improvement in the principle.

During tests, it has surprisingly been found that such an automatic welding machine keeps exactly to the track. At the correct setting, the operator no longer needs to carry out any corrections at all and the automatic welding machine runs along the weld. Consequently, an increased weld quality is obtained and the weld is also clearly improved visually. Fold formation is avoided. Since no further corrections have to be made, the automatic welding machine is also extremely easy to operate.

The guide wheel preferably has a narrow running surface, so that the highest possible force due to weight (the weight to be taken up by the guide wheel) acts on the running surface coming into contact with the plastic material. This causes the wheel to press into the plastic material. In order to achieve this, it is also possible to provide a wide guide wheel having parallel (narrow) prominences or rimmed portions which in their entire bearing area correspond to the bearing area of a narrow running surface. It is important that adhesion is achieved between the guide wheel and the plastic material transversely to the running direction.

If the automatic welding machine is provided with transport rollers, so that it can also be easily moved in the transport position and aligned with the welding line, weight must be transferred to the guide wheel in the welding position. To this end, the guide wheel, according to an advantageous configuration, is adjustable in the vertical direction relative to the chassis. This adjustment achieves the effect that, in the transport position, the weight of the chassis lies on the nearest transport roller, preferably a steering roller. In the welding position, the guide wheel takes up the weight of the chassis, the nearest transport roller being raised slightly from the floor.

As mentioned above, it is advantageous to keep the distance between the rigid pressure roller and the guide wheel as large as possible. The guide wheel is therefore advantageously located in front of the chassis. This is preferably effected by the guide wheel being mounted on a swivel arm mounted such that it can be swiveled about an axis and by it being possible for said guide wheel to be locked on the chassis at least in the welding position. This may be realized, for example, by means of cam plates, toggle levers, locking screws or the like and springs as restoring forces.

In the case of a chassis having a lateral chassis arm for the welding device to the side of the guide wheel, a transport steering roller is expediently arranged on the chassis arm in order to support the automatic welding machine and so as to not disturb the straight-ahead running at the same time.

In an automatic welding machine without a lateral chassis arm, the guide wheel, according to another advantageous design, is mounted eccentrically relative to the rotation axis of a swivel arm arranged on the chassis. Thus, in the known automatic welding machine having the swivel arm, the welding device on the one hand and the guide wheel on the other hand can be brought into the welding position. As a result, the transport roller is lifted from the floor.

In summary, it can be stated that, in addition to the advantages already mentioned above, such as keeping to the track along the tarpaulin edge, such an automatic welding machine is also exposed to less interference from the background. Since the operator does not have to guide the automatic welding machine, he can concentrate on the weld, i.e. the nozzle and its correct course. Consequently, the welding speed is also higher compared with the previous automatic machines, since the many corrections are not required. Lateral interference caused by the welding nozzle swinging in toward the weld is also less than previously. The entire automatic welding machine is capable of being positioned during idling.

BRIEF DESCRIPTION OF THE DRAWINGS

The invention is explained in more detail below with reference to the attached drawings of exemplary embodiments. In the drawings.

DETAILED DESCRIPTION

Figures 1, 3:
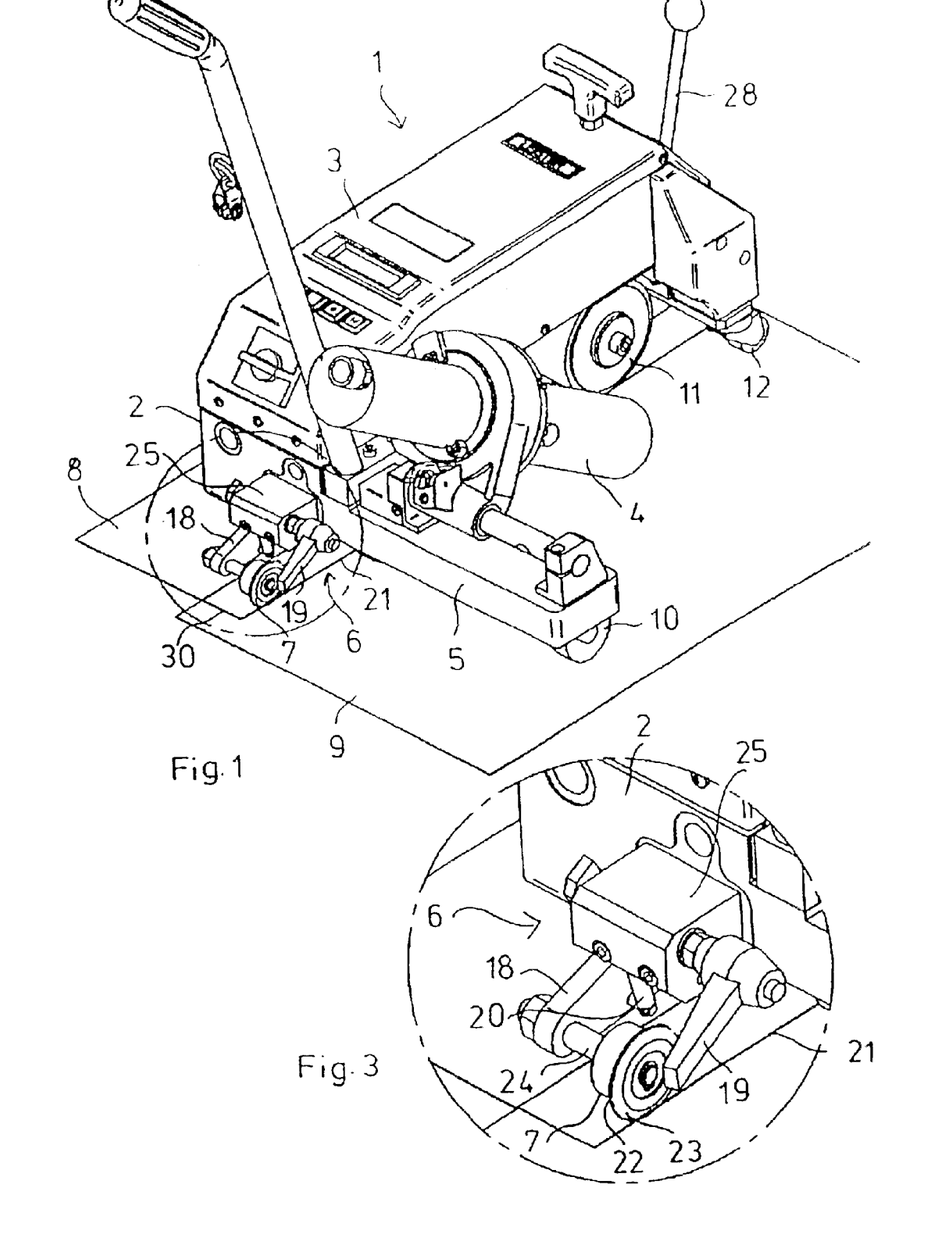
FIG. 1 shows a perspective view of a first exemplary embodiment of the automatic welding machine according to the invention, with a lateral chassis arm, transport rollers and guide wheel located in front, in the welding position.
FIG. 3 shows an enlarged representation of the guide device on the automatic welding machine according to FIGS. 1 and 2.

FIG. 1 shows the automatic welding machine 1 with the chassis 2 which carries the housing 3 with the drive unit and the welding device 4 on a lateral chassis arm 5. Located in front of the chassis 2 is a guide device 6 having a guide wheel 7 which runs along the edge 21 of a top tarpaulin 8 which is to be welded to a bottom tarpaulin 9. The driving and pressure roller 11 runs essentially on the overlap region 30 (weld region) of the tarpaulins 8 and 9. In this welding position, the automatic welding machine 1 is carried by the guide wheel 7, the transport roller 10 on the chassis arm 5, and the driving and pressure roller 11. Arranged in the rear region are further transport rollers 12, 13, which can be brought from a transport position into a welding position by means of the lever 28 and lift the driving and pressure roller 11 from the floor in the transport position.

Figure 2:
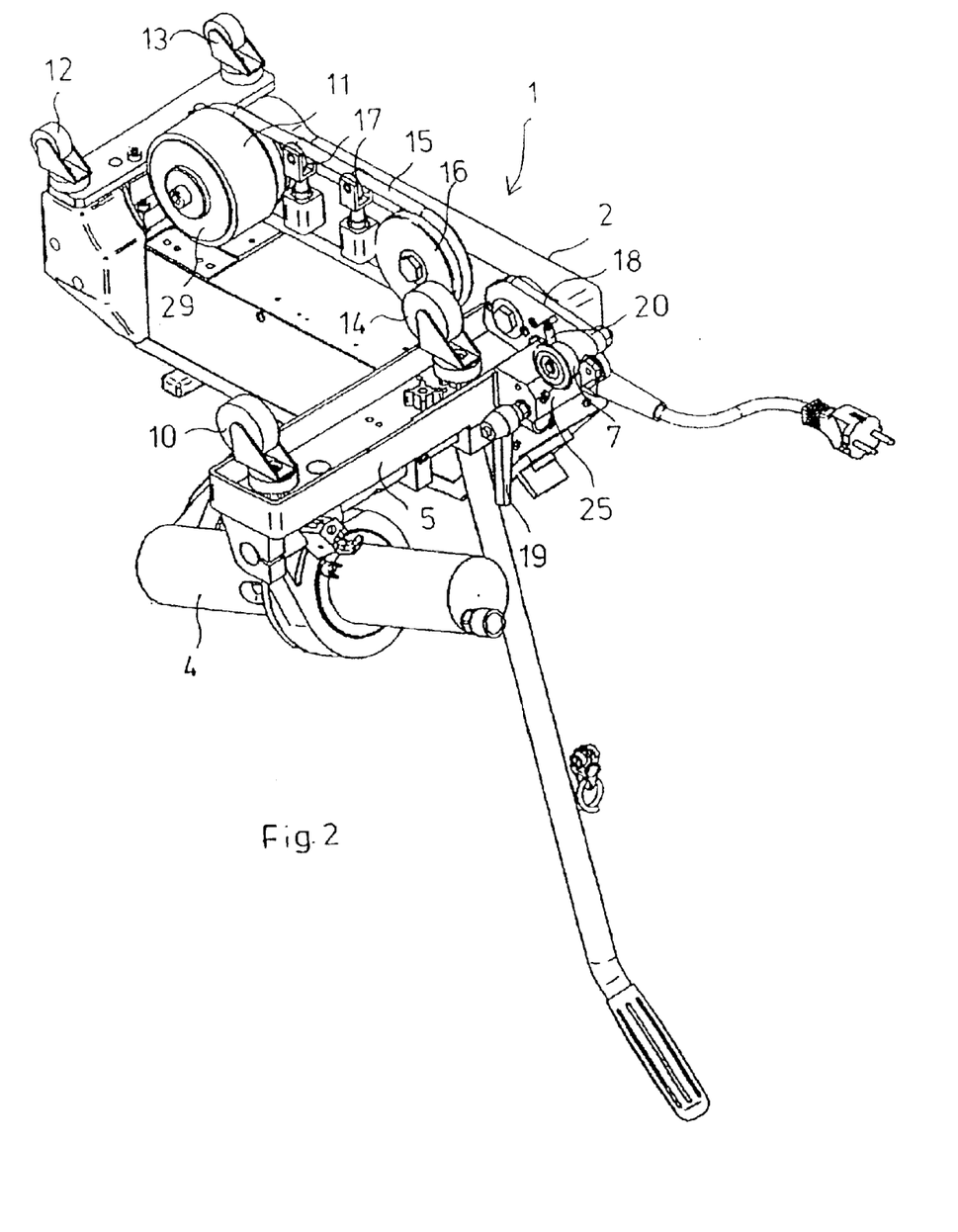
FIG. 2 shows a perspective view of the automatic welding machine according to FIG. 1 from below.

FIG. 2 shows the underside of the chassis 2 with the transport rollers 12, 13 in the rear region and the transport rollers 10, 14 on the chassis arm 5. All the transport rollers 10, 12 to 14 are designed as freely movable steering rollers. The figure also shows the driving and pressure roller 11, which drives a deflection roller 16 via a belt 15. In addition, the driving belt 15 is guided via flexibly mounted hold-down rollers 17. The guide wheel 7 is mounted on a swivel arm 18, which is mounted in a movable manner on the chassis 2. By means of the lever 19 attached to the holding device 25, the guide wheel 7, as will be shown below in conjunction with FIGS. 4 and 5, can be brought from the transport position into the welding position. The spring 20 resets the swivel arm 18 from the welding position into the transport position. In FIG. 2, the guide wheel is shown in the transport position.

In the welding position, the guide wheel 7 raises the chassis, so that the transport roller 14 loses contact with the floor, and the automatic welding machine rests on the guide wheel 7, the transport roller 10 and the driving device consisting of the driving and pressure roller 11, the driving belt 15 and the deflection roller 16.

FIG. 3 shows an enlarged representation of the guide device 6 with the guide wheel 7. Compared with FIG. 2, the lever 19 has been shifted, so that the guide wheel 7 rests firmly on the floor and travels along the edge 21. The guide wheel 7 has a narrow running surface 22, the thickness of the guide wheel in the region 23 decreasing toward the supporting surface 22. The guide wheel 7 is fastened to the swivel arm 18 via an axle 24.

Figure 4:
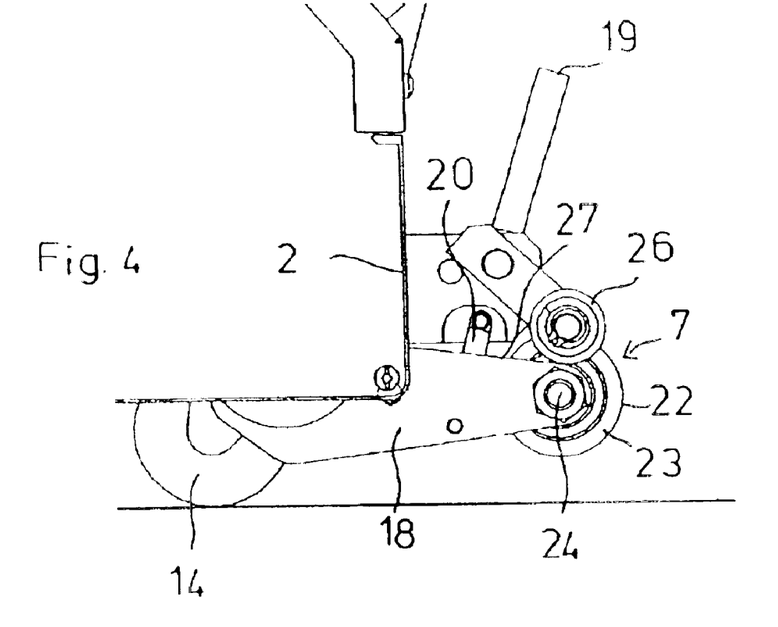
FIG. 4 shows the guide device according to FIG. 3 in the transport position.
Figure 5:
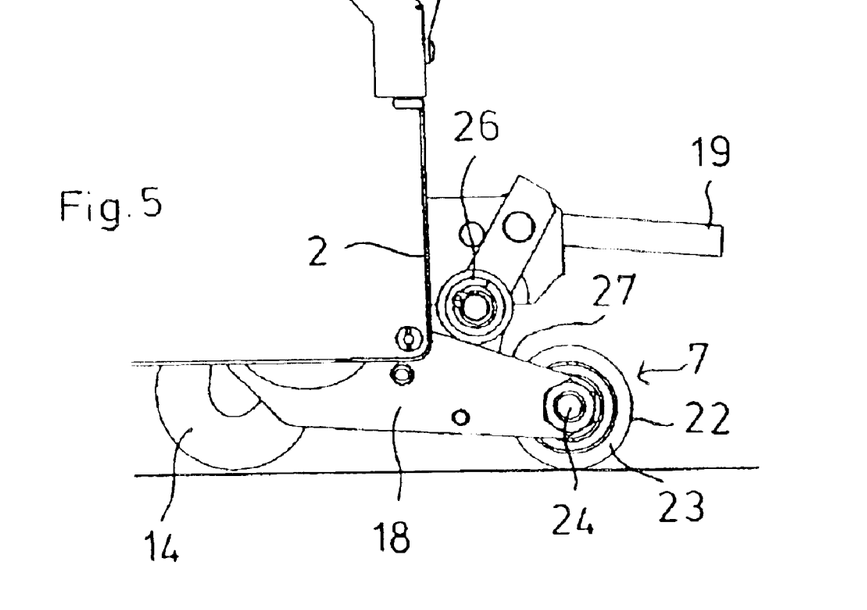
FIG. 5 shows the guide device according to FIG. 3 in the welding position.
Figure 6:
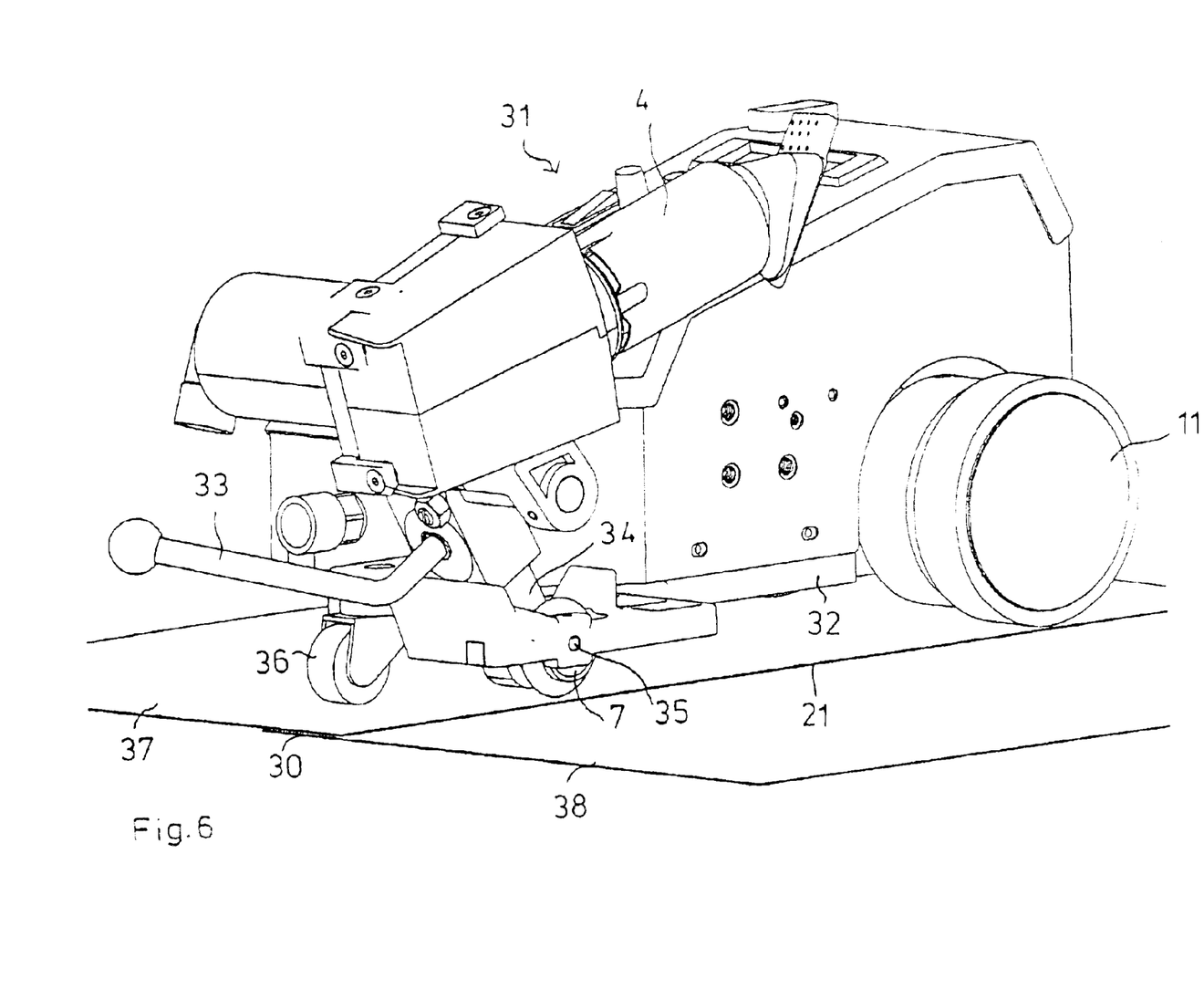
FIG. 6 shows another exemplary embodiment of the automatic welding machine according to the invention, with a chassis without lateral chassis arm, and with a transport roller located in front and also a guide wheel, in the transport position.
Figure 7:
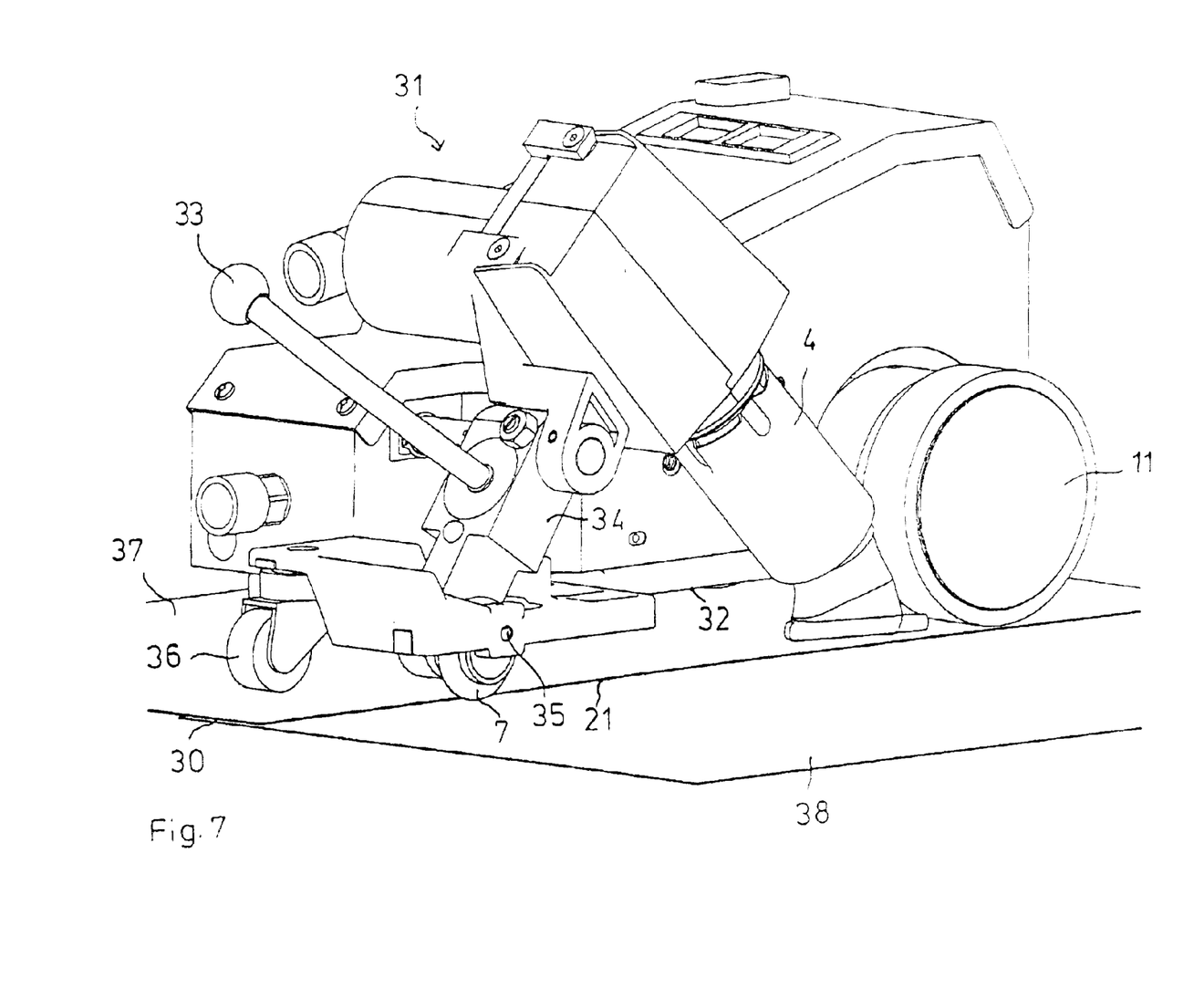
FIG. 7 shows the automatic welding machine according to FIG. 6 in the welding position.
Figure 8:
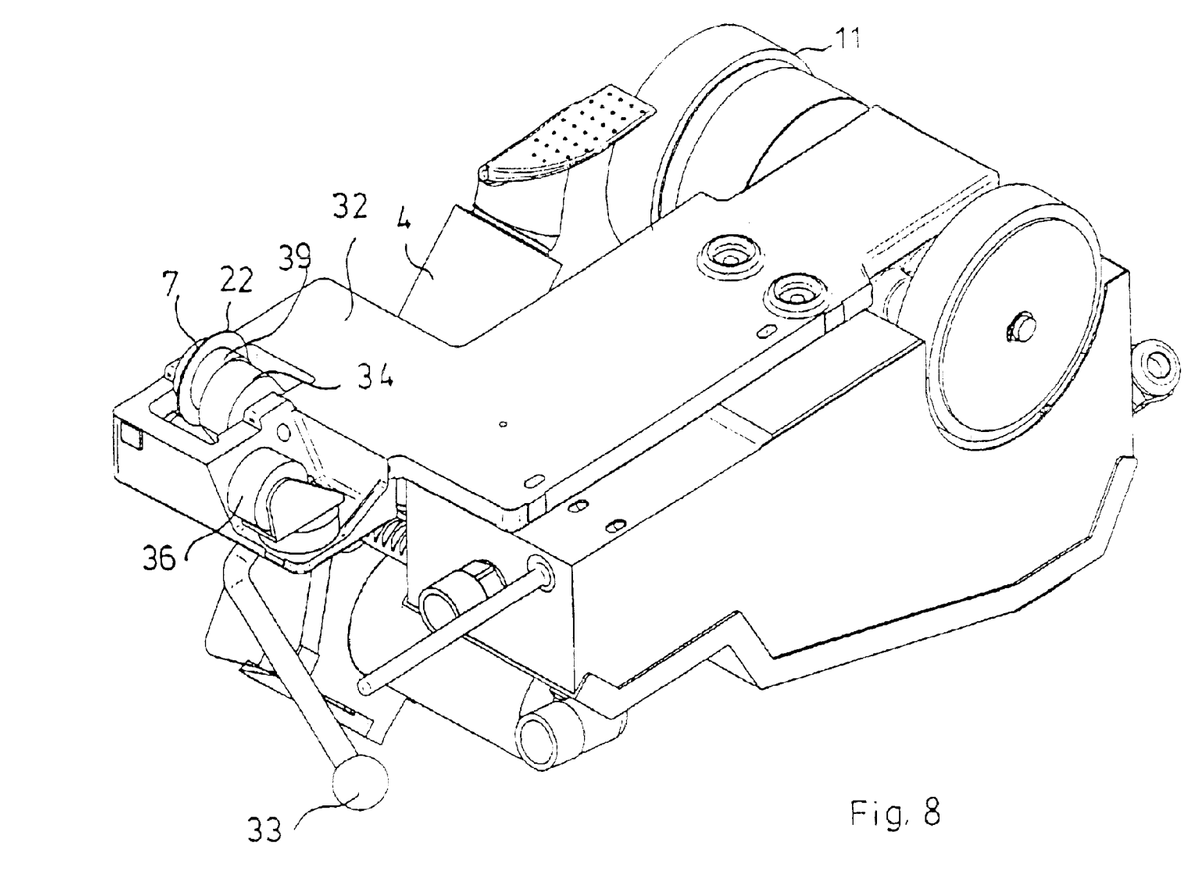
FIG. 8 shows the automatic welding machine according to FIG. 6 from below.
Figure 9:
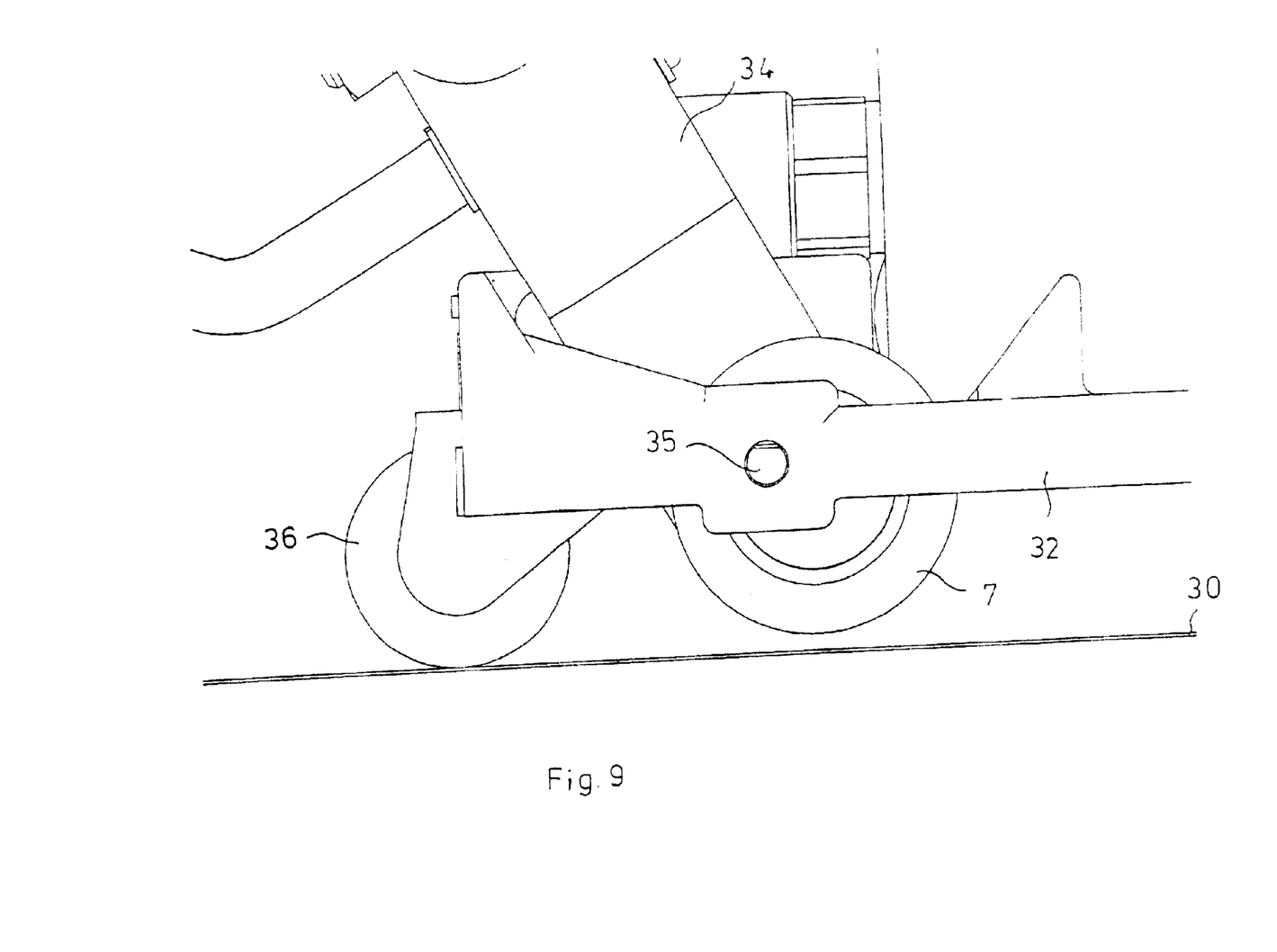
FIG. 9 shows an enlarged representation of the suspension of the guide wheel and of the transport roller in the transport position.
Figure 10:
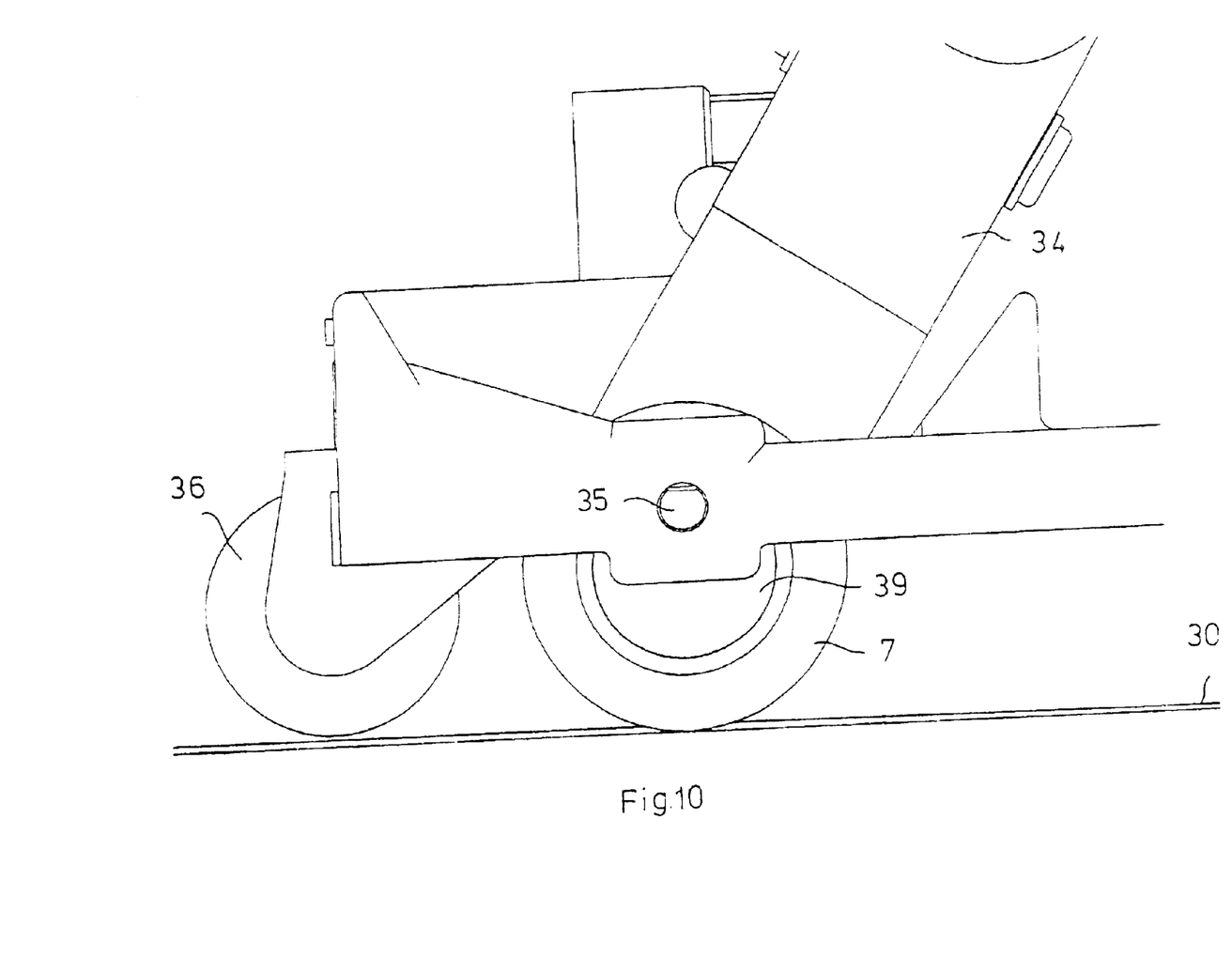
FIG. 10 shows an enlarged representation of the suspension of the guide wheel and of the transport roller in the welding position.
Figure 11:
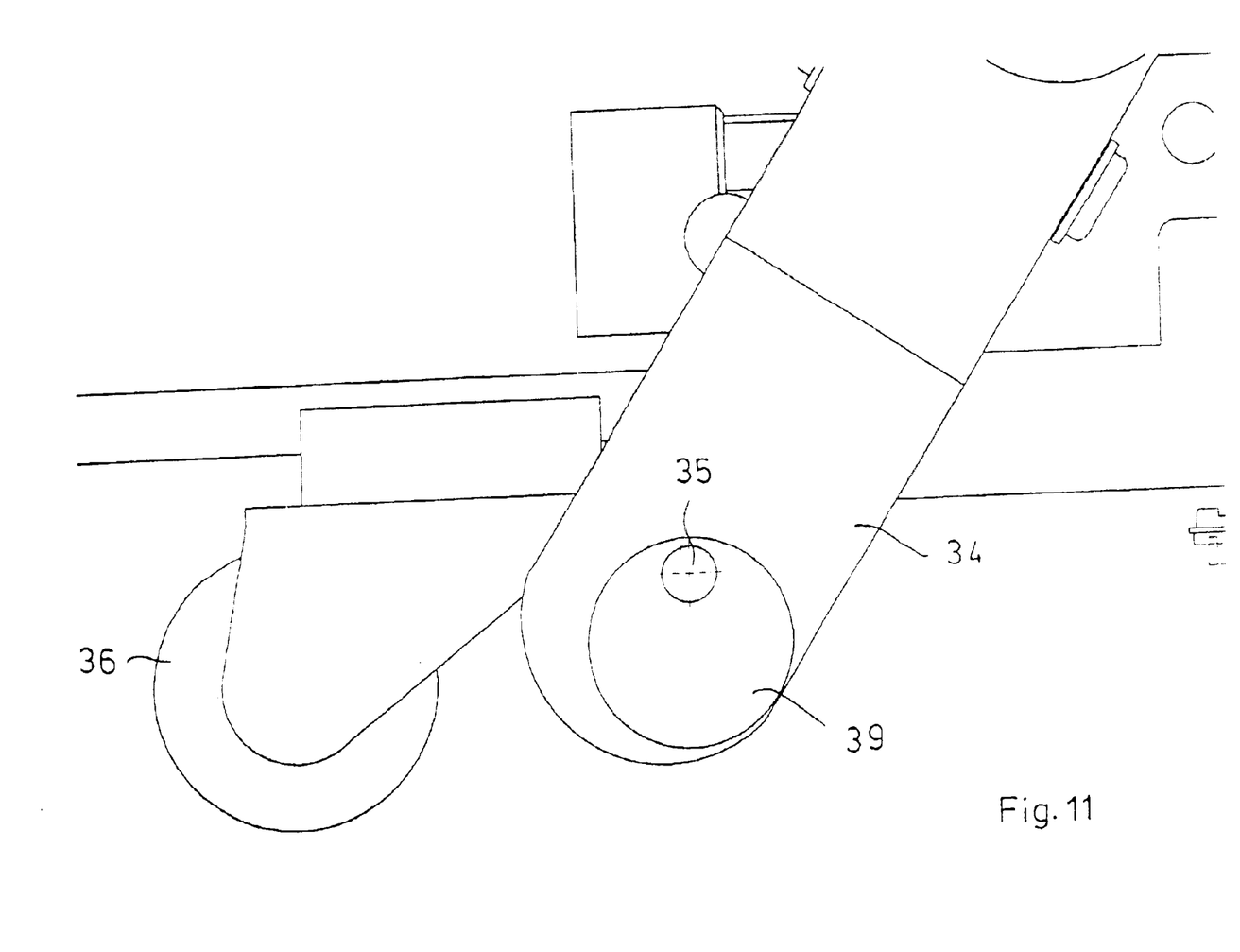
FIG. 11 shows an enlarged representation of the mounting of the guide wheel on the swivel arm for the welding device.

In FIGS. 4 and 5, the guide device 6 is shown in an enlarged representation from the side. They show the holding device 25 fastened to the chassis 2 and having the swivel lever 18, which is pulled upward via the spring 20, so that the guide wheel 7 is lifted off from the floor and the chassis 2 runs on the transport roller 14. By the lever 19 being moved, the roller 26 connected to the lever 19 moves on the surface 27 of the swivel arm 18. As a result of the predetermined distance between the roller 26 and the rotation axis of the lever 19, the guide wheel 7 is pressed onto the floor and the chassis 2 is raised slightly as a result, so that the transport roller 14 loses contact with the floor.

In the exemplary embodiment in FIGS. 6 to 11, parts identical to the first exemplary embodiment in FIGS. 1 to 5 are provided with the same designations. In the automatic welding machine 31 according to FIGS. 6 and 7, which is preferably used for welding plastic films, the welding device 4 is located directly on the chassis 32 and can be brought from the transport or rest position in FIG. 6 into the welding position in FIG. 7 by means of a lever 33 via a swivel arm 34, which can be swiveled about an axis 35 on the chassis 32. At the same time, the guide wheel 7, which is arranged eccentrically relative to the swivel arm 34 via the wheel carrier 39, is moved across a circular path in the vertical direction and in the process lifts off the transport steering roller 36 from the floor. This can also be seen from FIGS. 8 to 11. The guide wheel 7 then runs on the bottom film 38 along the edge 21 of the top film 37.

In both exemplary embodiments, the guide wheel 7, with respect to the pressure roller 11 running essentially on the welded overlap region 30, is arranged in such a way that, during the welding, it runs on the bottom plastic material 9, 38 along the edge 21 of the top plastic material 8, 37. The axes of the guide wheel 7 and of the pressure roller 11 are arranged parallel to one another and are to be oriented perpendicularly to the edge 21 of the top plastic material 8, 37 during the welding.

Figure 12:
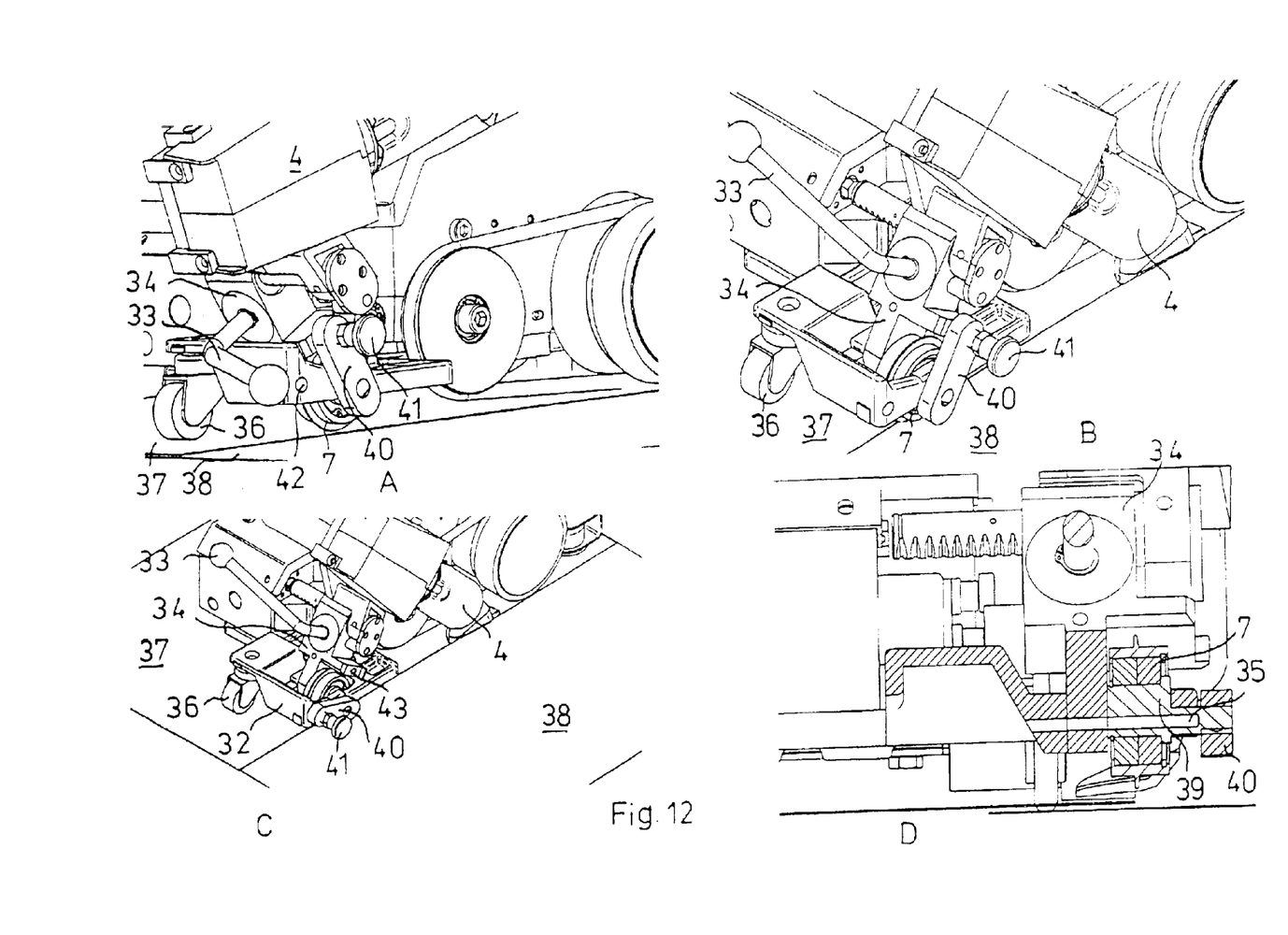
FIG. 12 shows another design of an automatic welding machine according to FIG. 6 in three different operating states (A, B, C) of the guide wheel, with an additional mechanism for uncoupling the guide wheel in the welding position, and in a sectional representation (D) of the mounting of the guide wheel.

Shown in FIG. 12 is an exemplary embodiment of an automatic welding machine in which, compared with the embodiments in the preceding figures, an additional lever 40 is provided, this additional lever 40 being connected to the wheel carrier 39 mounted eccentrically on the axle 35 (FIG. 12D). By means of a spring-mounted pin 41, the lever 40 can be locked in a hole 42 on the swivel arm 34 or in a hole 43 on the chassis 32. By means of the lever 40, the guide wheel 7 can also be uncoupled from the swivel arm 34 in the welding position (FIG. 12C), so that the automatic welding machine rests in this region on the transport steering roller 36. It is thus possible to also negotiate curves, which is necessary in certain applications. FIG. 12A shows the automatic welding machine in the transport position with swung-up welding device 4. The automatic welding machine is carried at the front by the transport steering roller 36; the guide wheel 7 does not touch the film 38. FIG. 12B shows the automatic welding machine in the welding position; the guide wheel 7 runs on the film 38. In both cases, the lever 40 is locked on the swivel arm 40. In FIG. 12C, compared with FIG. 12B, the lever 40 is locked on the chassis 32. As a result, the eccentrically mounted wheel carrier 39 is rotated and the guide wheel 7 is moved away upward from the film 38, so that the transport steering roller 36 again takes up the weight. Thus universal adaptation of the guide roller to the various applications is made possible with simple and cost-effective means.

What is claimed is:

1. An automatic welding machine for planar plastic materials, comprising: a chassis (2) and, arranged thereon, a welding device (4), a driving unit (11, 15 to 17), a pressure device (11) for the materials (8, 9; 37, 38) to be welded in an overlapping manner, wherein the chassis (2, 32), in the welding position, in addition to being carried by the driving unit and the pressure device (11, 15 to 17), is carried at least by one rigid guide wheel (7), the guide wheel (7), with respect to a pressure roller (11) of the pressure device (11) running essentially on the welded overlap region (30), being arranged in such a way that, during the welding, it runs along the bottom plastic material (9, 38) parallel to the edge (21) of the top plastic material (8, 37) thereby pressing into said bottom plastic material and guiding the welding machine.

2. The automatic welding machine as claimed in claim 1, wherein the guide wheel (7) has a narrow running surface (22).

3. The automatic welding machine as claimed in claim 1, including transport rollers (10, 12 to 14; 36), wherein the guide wheel (7) is adjustable in the vertical direction relative to the chassis (2) in order to lift the chassis (2) together with the nearest transport roller (14, 36).

4. The automatic welding machine as claimed in claim 3, wherein the guide wheel (7) is mounted on a swivel arm (18) mounted such that it can be swiveled about an axis and can be fixed on the chassis (2) at least in the welding position.

5. The automatic welding machine as claimed in claim 1, wherein the chassis (2) has a lateral chassis arm (5) for the welding device (4) to the side of the guide wheel (7), a transport steering roller (10) is arranged on the chassis arm (5).

6. The automatic welding machine as claimed in claim 3, wherein the guide wheel (7) is mounted eccentrically relative to the rotation axis (35) of a swivel arm (34) arranged on the chassis (32).

7. The automatic welding machine as claimed in claim 1, wherein the guide wheel (7) is located in front of the chassis (2, 32).

8. An automatic welding machine for planar plastic materials, comprising: a chassis (2) and, arranged thereon, a welding device (4), a driving unit (11, 15 to 17), a pressure device (11) for the materials (8, 9; 37, 38) to be welded in an overlapping manner, wherein the chassis (2, 32), in the welding position, in addition to being carried by the driving unit and the pressure device (11, 15 to 17), is carried at least by one rigid guide wheel (7), the guide wheel (7), with respect to a pressure roller (11) running essentially on the welded overlap region (30), being arranged in such a way that, during the welding, it runs along the bottom plastic material (9, 38) parallel to the edge (21) of the top plastic material (8, 37) wherein the guide wheel (7) is mounted eccentrically relative to the rotation axis (35) of a swivel arm (34) arranged on the chassis (32).

* * * * *